United States Patent Office 3,133,968
Patented May 19, 1964

3,133,968
METHOD OF MAKING ALDEHYDES AND KETONES
Joseph T. Kummer, Midland, Mich., assignor to The Dow Chemical Company, Midland, Mich., a corporation of Delaware
No Drawing. Filed Jan. 21, 1960, Ser. No. 3,712
13 Claims. (Cl. 260—597)

This invention concerns an improved method of oxidizing olefines to form carbonyl compounds.

A number of methods for the incomplete oxidation of olefines have heretofore been proposed and it is known that the results obtained differ markedly with changes in the reaction conditions employed. For instance, U.S. Patent 1,999,576 discloses that ethylene or propylene can be oxidized to form a corresponding glyoxal, or a polymer thereof, by being reacted at elevated temperatures with selenium dioxide; U.S. Patent 2,260,409 describes the preparation of maleic acid, or its anhydride, by passing a vapor mixture comprising free-oxygen, steam and a mono-olefine, containing at least 4 carbon atoms in the molecule, over a solid catalyst, comprising an oxide or salt of vanadium, bismuth, uranium, tungsten, chromium, manganese, or molybdenum, at from 250° to 400° C.; U.S. Patent 2,670,379 discloses the formation of unsaturated aldehydes from mono-olefines, e.g. the formation of acrolein from propylene, by passing a vapor mixture of the olefine, oxygen and selenium over a contact material comprising copper silicate at elevated temperatures; and U.S. Patent 2,688,041 obtains a similar result, e.g. oxidation of propylene to form acrolein, by passing a vapor mixture of propylene and air over a solid supported tellurium oxide-vanadium oxide catalyst at elevated temperatures and indicates that when an active support is used for such catalyst ingredients there is a tendency for a greater proportion of the reactants to be converted to ultimate oxidation products (presumably $CO_2$ and $H_2O$) than when an inert catalyst support is used. In a number of the known methods a mixture of an olefine and air, or other oxygen-containing gas is passed into contact with a heated body of an oxidation catalyst. This often results in formation of a mixture of oxidation products, such as those just mentioned, rather than in formation of a single desired product in good yield and readily purifiable form.

An object of this invention is to provide an improved method for oxidizing mono-olefines, having the olefinic linkage between hydrogen-bearing carbon atoms in an acyclic portion of the molecule, to produce corresponding carbonyl compounds.

Another object is to provide such a method whereby the carbonyl compounds may be produced in good yields and in readily purifiable form.

A further object is to provide such a method wherein the agent employed for the oxidation may, itself, periodically be re-oxidized and thus be regenerated to render it suitable for re-employment in the process.

A particular object is to provide such an improved method for the production of acetaldehyde from ethylene.

Another particular object is to provide such an improved method for the oxidation of propylene and its higher homologues to form corresponding ketones therefrom.

Further and related objects will be evident from the following description of the invention.

It has ben found that under the reaction conditions hereinafter set forth, acidic aqueous solutions or slurries of vanadium compounds, containing at least a portion of the vanadium in pentavalent state, are effective as agents for oxidizing olefinic hydrocarbons, containing a single olefinic linkage in an acyclic portion of the molecule and having said olefinic linkage between a pair of hydrogen-bearing carbon atoms, i.e. containing the radical —CH=CH— 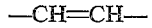

to form a corresponding carbonyl compound, e.g. an aldehyde or a ketone, therefrom.

It has further been found that the carbonyl compounds, and any unconsumed olefine, can readily be vaporized or otherwise removed, from the solution, suspension, or slurry of the vanadium compounds.

In producing acetaldehyde from ethylene by the present method, it has been found advantageous to remove the acetaldehyde, as completely as possible from the aqueous reaction liquor prior to re-oxidation of vanadium compounds in the liquor with elemental oxygen. Otherwise part of the acetaldehyde product usually is destroyed through conversion to a by-product material which subsequently is slowly oxidized, apparently by reaction with a portion of the pentavalent vanadium compound, or compounds, present with resulting formation of carbon dioxide. This results in losses both of some of the acetaldehyde product and of part of the pentavalent vanadium. The ketones formed by oxidizing propylene or higher olefines in accordance with the method of the invention are in most instances more resistant to further oxidation than is acetaldehyde and it is less important that the ketones be stripped, as fully as possible, from the aqueous solution or mixture of the vanadium compounds prior to re-oxidation of the latter. However, it is desirable, in any instance, that the carbonyl product formed by the present method be stripped from the aqueous reaction liquor prior to treatment of the latter with oxygen to re-oxidize, and thus regenerate, a vanadium compound contained therein.

It has further been found that vanadium compounds in the spent aqueous liquor remaining after the olefine oxidation reaction can readily be re-oxidized to convert a portion of the vanadium to the pentavalent state and that the aqueous solution or mixture of vanadium compounds is then in condition for re-employment to oxidize a further quantity of one or more olefines to form corresponding carbonyl compounds, i.e. aldehydes or ketones.

On a basis of these discoveries there has been devised an improved method for the oxidation of mono-olefines to form carbonyl compounds, as herein described.

An at least slightly acidic aqueous solution, suspension, or slurry of one or more compounds of vanadium, the latter being at least partly in pentavalent state, is used for the oxidation of mono-olefines by the present method. Such aqueous mixtures of tetravalent and pentavalent vanadium compounds are usually employed. One or more sulfates or bisulfates of sodium or potassium may also be present, but are not required. Although vanadium compounds substantially free of other heavy metal compounds are preferably employed in the aqueous mixture, complete absence of other heavy metal compounds is not required. The presence of minor or trace amounts of compounds of other heavy metals, e.g. zinc or copper, etc., can usually be tolerated.

The degree of acidity of the aqueous solution or mixture of vanadium compounds and the concentration or proportion of the latter present are of importance. The aqueous solution or slurry of vanadium compounds must be at least slightly acidic at the stage in the process in which it contains a pentavalent vanadium compound and is to be used as an agent for oxidizing an olefine. However, the reaction of oxygen with a lower valent, e.g. a tetravalent, vanadium compound in the presence of water generates hydrogen ions and thus tends to render the mixture acidic, or to increase its acidity. A sufficiently acidic aqueous solution, suspension, or slurry of vanadium compounds, containing at least part of the vanadium in pentavalent state, can be formed by the oxidation of an aqueous solution or mixture of vanadium compounds containing vanadium in a lower valency, e.g. a tetravalent state. In other words, an aqueous solution or mixture of one or more tetravalent vanadium salts, e.g. $VOSO_4$, can be oxidized to obtain an acidic aqueous solution or mixture of vanadium compounds, comprising pentavalent vanadium, that is suitable for use in oxidizing olefines to form organic carbonyl compounds.

As just indicated, the aqueous solution or slurry of vanadium compounds need not be strongly acidic at a stage in the process prior to oxidation of the same to form pentavalent vanadium from a compound of vanadium in a lower valency state, but must be at least slightly acidic at the stage in which it contains pentavalent vanadium and is to be used for the oxidation of an olefine. Referring to the process of the invention as a whole, the effects of the degrees of acidity of the aqueous solution or mixture of vanadium compounds may be described as follows. When the aqueous solution or mixture contains the vanadium compounds in a low or moderate total concentration, e.g. corresponding to that of a less than 1 molar solution of $VOSO_4$, and comprises one or more pentavalent vanadium compounds, the rate at which the pentavalent vanadium causes oxidation of an olefine at a given temperature and pressure becomes greater with increase in the hydrogen ion concentration, i.e. acidity, of the solution or slurry of the vanadium compounds. However, this effect of acidity on the rate of the olefine-oxidation reaction becomes less pronounced with increase in the total concentration of the dissolved vanadium compounds. The rate of the olefine-oxidation reaction becomes greater with increase in the concentration or proportion of dissolved vanadium compounds present at a given pH value for the aqueous solution or slurry thereof. On the other hand, the rate at which the valence of vanadium can be raised from 4 to 5 by reaction of the aqueous system with oxygen, under otherwise similar reaction conditions, decreases with increase in the acidity of the aqueous mixture. Since these alternate steps are usually carried out repeatedly with the same body of the aqueous system of vanadium compounds in practice of the invention, it is advantageous that the degree of acidity of the system and the concentration or proportion of vanadium compounds present therein be within ranges which are suitable for both such reactions. Aqueous solutions or slurries containing an average of at least 0.1, and preferably 2 or more, gram atoms of vanadium, chemically combined in the vanadium compound or compounds therein, per liter are usually employed, although aqueous systems containing smaller concentrations or proportions of the vanadium compounds can be used. It is not necessary that the vanadium compounds be completely dissolved in the acidic aqueous medium, but it apparently is necessary that at least an appreciable amount of such compound or compounds containing pentavalent vanadium be dissolved in the aqueous liquor at the stage in the process in which an olefine is to be oxidized. In general, aqueous mixtures as rich in vanadium compounds as can conveniently be handled are preferably employed and there is no sharp upper limit as to the concentration or proportion of vanadium compounds that may be present. However, solutions, suspensions or slurries that are sufficiently thin, or dilute, to permit ready stirring and transfer, e.g. by means of a pump, from one vessel to another are most conveniently handled and are preferred.

Although the aqueous solution or mixture of vanadium compounds containing at least part of the vanadium in pentavalent state, must be acidic at the stage in the process in which it is to be used for the oxidation of an olefine, too high an acidity interferes with the oxidation or re-oxidation, of tetravalent vanadium to the pentavalent state and is to be avoided. The oxidation of a solution of a tetravalent vanadium compound, such as $VOSO_4$, often results in formation of an acidic slurry if carried out to a point at which five percent or more of the vanadium is pentavalent. The aqueous slurry thus formed is effective for oxidizing olefines, but may be too thick for convenience of handling. However, the presence, during the oxidation of tetra- to pentavalent vanadium, of even a minor amount of a soluble acidic compound other than that formed by said oxidation, e.g. the presence of 0.05 gram mole or more of $H_2SO_4$ per liter of the mixture, or the presence of a chemically equivalent proportion of a soluble acidic salt, such as 0.1 gram mole or more of $NaHSO_4$ or of $KHSO_4$ per liter of the mixture, prevents formation of an excessively heavy precipitate of vanadium compounds and is advantageous for convenience of handling. On the other hand, since the rate of oxidation, or re-oxidation, of tetravalent vanadium to the pentavalent state decreases with increase in acidity of the aqueous mixture, under otherwise similar reaction conditions, care should be taken to avoid rendering the mixture too highly acidic. The aqueous mixture of vanadium compounds, when at a stage in the process preceding oxidation of such compounds of tetravalent vanadium to the pentavalent vanadium state, is preferably of an acidity corresponding to the presence of not more than 2 gram moles of $H_2SO_4$, or not more than 4 gram moles of an alkali metal bisulfate, per liter.

Any aqueous solution, suspension, or slurry of vanadium compounds which meets the several requirements set forth above can be used as an agent for the oxidation of olefines in the process of the invention. However, aqueous solutions of vanadyl sulfate, $VOSO_4$, and an alkali metal sulfate, or sulfuric acid, or a mixture thereof, which solutions are of concentrations and of acidity within the limits set forth above and have been oxidized to raise the valence of at least a portion of the vanadium to the pentavalent state, are preferred. In some instances a precipitate forms during the oxidation of the dissolved vanadyl sulfate. The resulting aqueous suspensions or slurries, when formed, have contained sufficient of the vanadium compounds, including one or more pentavalent vanadium compounds, in dissolved state to be satisfactory for use in the process of the invention. During such use for the oxidation of an olefine, the precipitated material usually redissolves. The vanadyl sulfate can be added as such, or can be formed in situ, e.g. from vanadium oxides, during preparation of the solution or slurry of the vanadium compounds, as illustrated in the specific examples hereinafter set forth.

The oxidation of an aqueous solution of one or more vanadium compounds having a valence of 4 or lower to a condition in which at least part of the vanadium is pentavalent can be accomplished in known ways, e.g. by an electrolytic oxidation or by treatment with a chemically reactive oxidizing agent. It is conveniently accomplished by a unique operation of passing oxygen or an oxygen-containing gas, e.g. air, into the solution at a pressure of from 50 to 500 p.s.i. while heating the solution at temperatures of 100° C. or higher, e.g. between 100° and 250° C. and preferably between 150° and 250° C. As hereinbefore mentioned, during such oxidation a portion of the vanadium compounds sometimes forms a precipitate, e.g. of a hydrated chemical complex of oxides of vanadium in tetravalent and pentavalent states. The extent to which the oxidation can be carried before a precipitate starts to form becomes greater with increase in the concentration of the tetravalent vanadium compound, e.g. vanadyl sulfate, present. For this and other reasons, hereinbefore mentioned, it is preferable that the acidic aqueous starting solution which is to be oxidized contain one or more vanadium compounds, e.g. vanadyl sulfate, in 2 molar total concentration or higher. Even when employing such 2 molar or higher concentrations of the vanadium compounds, precipitation may occur as the oxidation is continued, e.g. to a stage at which from 8 to 10 percent or more of the vanadium has been oxidized to the pentavalent state. Although formation of the precipitate does not prevent use of the resulting slurry as an agent for the oxidation of olefines, it is sometimes disadvantageous from a handling viewpoint, e.g. in passing the mixture through a pipe from one vessel to another. For this reason the oxidation is usually terminated when 10 percent or less, e.g. from 1 to 10, and preferably from 5 to 10, percent of the vanadium has been oxidized to the pentavalent state. The oxidizing agent thus formed is an acidic aqueous solution or a thin aqueous suspension or slurry of tetravalent and pentavalent vanadium compounds.

Unconsumed oxygen is then preferably swept from said agent by passing steam or an inert gas, such as nitrogen or argon, etc., therethrough. Such removal of the oxygen is not essential, but is desirable as a precaution against occurrence of an explosion or of side reactions and by-product formation in the olefine oxidation stage of the process.

Examples of mono-olefines that can be oxidized by the method of the invention to form a corresponding aldehyde or ketone are ethylene, propylene, n-butylene-1, n-butylene-2, n-pentene-1, n-pentene-2, and isoamylene; etc. Apparently any acyclic mono-olefinic hydrocarbon which, except for the single olefinic linkage between hydrogen-bearing carbon atoms, is saturated, can be oxidized in accordance iwth the invention to form a corresponding carbonyl compound in good yield.

The carbonyl compound is formed by passing the olefine, alone or together with a substantially inert gas or vapor, such as, steam or nitrogen, into or through the above-described acidic aqueous mixture of vanadium compounds, containing at least part of the vanadium in pentavalent state, while heating the reaction mixture at 100° C. or above, e.g. between 100° and 200° C. and preferably between 120° and 180° C. Under these conditions, the reaction usually occurs sluggishly at atmospheric pressure, but becomes more rapid with increase in the pressure. The olefine is usually fed to the reaction at a rate and pressure such as to maintain the mixture at a pressure of from 50 to 500 p.s.i.g. during the reaction period.

The carbonyl compound that is formed may be separated from the mixture in usual ways, e.g. by extraction with a water-immiscible solvent therefor or by vaporization. In practice, it is usually vaporized from the mixture by passing a current of steam or other inert gas or vapor, e.g. an excess of the olefine, or nitrogen, etc., through the mixture and condensing and separating it from the effluent gases or vapors. Other ways in which it can be removed from the reacted mixture and be recovered will be evident. The carbonyl product can be purified by fractional distillation.

The remaining aqueous solution or mixture of vanadium compounds from which the carbonyl product has been removed may be re-oxidized, as hereinbefore described, to convert at least part of the vanadium to a pentavalent state. It is then in condition for re-employment in the process for the production of a further amount of a carbonyl compound.

The process as just described may be carried out batchwise or in a continuous manner. In the batch mode of operation, the aqueous mixture of vanadium compounds may be retained in a reaction vessel throughout the above-described successive stages of the process. It may be employed repeatedly in preparing successive batches of a carbonyl compound. Such batchwise mode of operation does not require transfer of the aqueous mixture of vanadium compounds from one vessel to another and permits employment, at the start of the olefine-oxidation stage of the process, of such aqueous mixture containing vanadium compounds pre-oxidized to an extent such that the aqueous mixture is a fairly thick slurry comprising a precipitate of a portion of the vanadium compounds present in the liquid medium. The aqueous slurry resulting from such extensive pre-oxidation of the vanadium compounds has a high oxidizing capacity toward olefines.

In practice of the process in continuous manner the aqueous mixture of vanadium compounds is circulated, e.g. by pumping, through a series of zones in which the above-described respective stages of the process are carried out. This permits practice of each of said stages in a continuous manner. For such continuous practice it is preferable that the acidic aqueous mixture of vanadium compounds be in mobile liquid, or substantially liquid, condition, i.e. that it be either a solution or a thin suspension or slurry, so that it can readily be pumped or otherwise circulated as a stream through the several zones.

The following examples decribe a number of ways in which the invention has been practiced, but are not to be construed as limiting the scope of the invention.

*Example 1*

Ethylene at a pressure of 50 p.s.i.g. was passed into a mixture of 25 grams (0.1375 gram mole) of $V_2O_5$, 0.36 gram mole of $H_2SO_4$ and 210 cc. of water while stirring and heating, at 145° C., the mixture in a vessel which was provided with a vapor outlet having a relief valve for maintaining said vapor pressure on the reaction mixture while permitting flow of gas through and from the vessel. The rate of feed of the ethylene was 109 cc. (expressed as at 0° C. and 760 mm. of mercury, absolute pressure) per minute. The effluent gas was analyzed as it flowed from the vessel. The proportion of acetaldehyde in the gas flowing from the vessel increased to a maximum value of 11 percent by volume (the remainder being principally unconsumed ethylene) in 60 minutes from the start of operation and, 310 minutes after starting the process, had decreased to 0 percent or thereabout. A total of 0.135 gram mole of acetaldehyde was formed. Only a minor amount of carbon dioxide was formed, i.e. the percent by volume of carbon dioxide in the outflowing gas rose to a maximum of only 0.14 percent in 45 minutes, and then decreased to about 0 percent in 150 minutes, from the start of operation of the process.

*Example 2*

The procedure of Example 1 was repeated, except that the mixture into which the ethylene was passed initially consisted of 10 grams (0.055 gram mole) of $V_2O_5$, 0.37 gram mole of $NaHSO_4$ and 220 cc. of water. The proportion of acetaldehyde in the outflowing gas increased to 0.4 percent by volume in 60 minutes from the start of the process. The feed of ethylene was then interrupted and argon was passed through the mixture to sweep unconsumed ethylene and the acetaldehyde product therefrom. To the remaining mixture there was then added 0.117 gram mole of $H_2SO_4$. The inflow of ethylene to the mixture, at the flow rate and under the conditions of temperatures and pressure given in Example 1, was then resumed. Sixty minutes after resuming the feed of ethylene the proportions of acetaldehyde and carbon dioxide had risen to 1.05 and 0.02 percent by volume, respectively. The inflow of ethylene was again interrupted and unconsumed ethylene and acetaldehyde were swept from the reaction mixture by passing argon therethrough. To the remaining mixture there was added 0.055 gram mole of $VOSO_4$. The feed of ethylene, at the rate and under the conditions of temperature and pressure hereinbefore indicated, was resumed. Sixty minutes after this second resumption of the process the proportion of acetaldehyde in the outflowing gas stream had risen to 7.6 percent by volume. This experiment indicates that the rate of the ethylene oxidation reaction becomes greater with increase either in the acidity of the reaction mixture, or in the concentration or proportion of $VOSO_4$ present, or both.

*Example 3*

This example illustrates the steps of pre-oxidizing an aqueous vanadyl sulfate, $VOSO_4$, solution and thereafter using the solution as an agent for the oxidation of ethylene to form acetaldehyde. It also shows that unless pre-oxidized, such vanadyl sulfate solution is not effective for the purpose. Oxygen was fed for 1 hour at a pressure of 55 p.s.i.g. and a rate of 75 cc. per minute (expressed as at 0° C. and 760 mm. absolute pressure) into 250 cc. of an aqueous solution of $VOSO_4$ in 1.24 molar concentration and of $NaHSO_4$ in 0.8 molar concentration while stirring the solution and heating it at 129° C. in a vessel provided with an outlet having a relief valve for maintaining said pressure in the vessel while permitting escape of any unconsumed gas. The solution, which initially had been dark blue and transparent, was, after the treatment with oxygen, of bluish green color and opaque. Unconsumed oxygen was then swept from the liquor by passing argon therethrough. Ethylene was then fed, at 50 p.s.i.g. pressure and at a rate of 109 cc. per minute (expressed as at 0° C. and 760 mm. absolute pressure), into the reaction mixture while stirring the latter and heating it at 142° C. Due to said pressure in the reaction vessel, gas flowed therefrom through the relief valve. The outflowing gas was analyzed. Thirty minutes after starting the feed of ethylene, the proportion of acetaldehyde in the outflowing gas had risen to 19 percent by volume. A total of 0.033 gram mole of acetaldehyde was formed as substantially the only organic reaction product, i.e. very little, if any, carbon dioxide or acetic acid were formed. At the end of the ethylene oxidation reaction, the aqueous solution remaining in the reaction vessel was again dark blue and transparent.

In another experiment, ethylene was passed at 50 p.s.i.g. pressure and at a rate of 109 cc. per minute (expressed as at 0° C. and 760 mm. absolute pressure) into a stirred aqueous vanadyl sulfate solution that had been prepared by dissolving 20 grams of $VOSO_4 \cdot 2H_2O$ in 240 cc. of water. The vessel containing the solution was provided with a vapor outlet having a relief valve for maintaining said pressure in the vessel while permitting gas to flow therefrom. The outflowing gas was analyzed and no acetaldehyde was found therein, i.e. it consisted for the most part of unconsumed ethylene.

*Example 4*

The following comparative experiments show that the rate at which an aqueous vanadyl sulfate solution reacts with oxygen becomes slower with increase in acidity of the solution. In one experiment oxygen was passed for 30 minutes at 55 p.s.i.g. pressure and at a rate of 75 cc. per minute (expressed as at 0° C. and 760 mm. absolute pressure) into and through 250 cc. of an aqueous solution containing 0.475 gram mole of vanadyl sulfate and 0.2 gram mole of $NaHSO_4$. The starting solution consisted only of water, vanadyl sulfate and $NaHSO_4$ in the proportions just indicated. The other experiment was carried out in similar manner using 250 cc. of a starting solution, having the composition just stated, except that 0.25 gram mole of $H_2SO_4$ was initially added to said starting solution. After oxygen had been passed through each of these solutions for the time and under the conditions of flow rate, temperature and pressure stated above, unconsumed oxygen was swept therefrom with a stream of argon. Ethylene was then passed through each solution in the manner and under the reaction conditions set forth in Example 1 until acetaldehyde formation had ceased. The total amount of acetaldehyde formed in each experiment was determined. In the experiment using the aqueous solution of vanadyl sulfate and $NaHSO_4$ as the only initial solutes, a total of 0.027 gram mole of acetaldehyde was formed, whereas in the experiment using the aqueous solution of vanadyl sulfate, $NaHSO_4$ and $H_2SO_4$ only 0.006 gram mole of acetaldehyde was formed. It is apparent that the last mentioned solution was less extensively oxidized by the treatment with oxygen than was the other solution.

*Example 5*

Oxygen was passed for 30 minutes and at 55 p.s.i.g. pressure and at a rate of 75 cc. per minute (expressed as at 0° C. and 760 mm. absolute pressure) into 250 cc. of an aqueous solution of vanadyl sulfate in 3 molar concentration and $NaHSO_4$, in 0.8 molar concentration while stirring and heating the mixture at 120° C. in a vessel having a vapor outlet provided with a valve for maintaining said pressure in the vessel while permitting gas to flow from the vessel. Unconsumed oxygen was then swept from the mixture by passing a stream of argon therethrough. Propylene was then passed through the mixture in the vessel at 15 p.s.i.g. pressure and at a rate of 95 cc. per minute (expressed as at 0° C. and 760 mm. absolute pressure) while stirring the mixture and maintaining it at 100° C. Acetone was thereby formed as substantially the only organic reaction product.

*Example 6*

The experiment of Example 5 is repeated, except that butene-1 is employed as the olefine reactant. Ethyl methyl ketone is formed as the principal, and substantially only, organic reaction product.

*Example 7*

The experiment of Example 5 is repeated, except that butene-2 is employed as the olefine reactant. Ethyl methyl ketone is formed as the principal organic reaction product.

I claim:

1. A method for the production of an acyclic carbonyl compound selected from the class consisting of aldehydes and ketones, which method comprises oxidizing an acyclic mono-olefine, having the olefinic linkage between hydrogen-bearing carbon atoms, by reacting said acyclic mono-olefine, at a temperature of from 100° to 200° C. and a pressure of from 50 to 500 p.s.i.g., with an acidic aqueous mixture of vanadium compounds as the oxidizing agent, which aqueous mixture contains an average of at least 0.1 gram atomic weight of vanadium chemically combined in said vanadium compounds per liter of the aqueous mixture and includes an at least partially dissolved pentavalent vanadium compound, selected from the class consisting of vanadium pentoxide and oxidation products of vanadyl sulfate, together with sufficient sulfate ions for such solubilization of vanadium in its pentavalent state.

2. A method, as claimed in claim 1, wherein the aqueous mixture of vanadium compounds comprises vanadyl sulfate together with an oxidation product of vanadyl sulfate containing pentavalent vanadium.

3. A method, as claimed in claim 1, wherein the aqueous mixture of vanadium compounds is an aqueous mixture of vanadium pentoxide and sulfuric acid.

4. A method, as claimed in claim 1, wherein the aqueous mixture of vanadium compounds comprises sodium bisulfate, vanadyl sulfate and an oxidation product of the latter containing pentavalent vanadium.

5. In a method as claimed in claim 1, the steps of removing organic ingredients from the reacted mixture and conditioning the remaining aqueous mixture for re-use in the method of claim 1 by contacting it with an $O_2$-containing gas at a reaction temperature between 100° and 250° C. and a pressure of from 50 to 500 p.s.i.g., said aqueous mixture, after such contact with the $O_2$-containing gas, being of an acidity corresponding to that resulting from such contact and from the presence of $H_2SO_4$ in from 0 to 2 molar concentration immediately prior to the treatment with the oxygen-containing gas.

6. A method for making acetaldehyde which comprises oxidizing ethylene by reacting the latter, at from 100° to 150° C. and at a pressure of from 50 to 500 p.s.i.g., with an acidic aqueous mixture of vanadium compounds as the oxidizing agent, which aqueous mixture contains an average of at least 2 gram atomic weights of vanadium chemically combined in said vanadium compounds per liter of the aqueous mixture and includes an at least partially dissolved pentavalent vanadium compound, selected from the class consisting of vanadium pentoxide and oxidation products of vanadyl sulfate, together with sufficient sulfate ions for such solubilization of vanadium in its pentavalent state.

7. In a method, as claimed in claim 6, the steps of removing organic ingredients from the reacted mixture and conditioning the remaining aqueous mixture for re-use in the method of claim 6 by contacting it with an $O_2$-containing gas at a reaction temperature between 100° and 250° C. and a pressure of from 50 to 500 p.s.i.g., said aqueous mixture, after such contact with the $O_2$-containing gas, being acidic and of a degree of acidity corresponding to that resulting from such contact and from the presence of $H_2SO_4$ in not more than 2 molar concentration immediately prior to the treatment with the oxygen-containing gas.

8. A method for making ketones which comprises oxidizing an acyclic mono-olefine containing at least 3 carbon atoms in the molecule, and having the olefinic linkage between two hydrogen-bearing carbon atoms, by reacting the acyclic mono-olefine, at a temperature of from 100° to 200° C. and a pressure of from 50 to 500 p.s.i.g., with an acidic aqueous mixture of vanadium compounds as the oxidizing agent, which aqueous mixture contains an average of at least 2 gram atomic weights of vanadium chemically combined in said vanadium compounds per liter of the aqueous mixture and includes an at least partially dissolved pentavalent vanadium compound, selected from the class consisting of vanadium pentoxide and oxidation products of vanadyl sulfate, together with sufficient sulfate ions for such solubilization of vanadium in its pentavalent state.

9. In a method, as claimed in claim 8, the steps of removing organic ingredients from the reacted mixture and conditioning the remaining aqueous mixture for re-use in the method of claim 8 by contacting it with an $O_2$-containing gas at a reaction temperature between 100° and 250° C. and at a pressure of from 50 to 500 p.s.i.g., said aqueous mixture, after such contact with the $O_2$-containing gas, being acidic and of a degree of acidity corresponding to that resulting from such contact and from the presence of $H_2SO_4$ in not more than 2 molar concentration immediately prior to the treatment with the oxygen-containing gas.

10. A method for making acetone which comprises oxidizing propylene by reacting the latter, at a temperature of from 100° to 200° C. and a pressure of from 50 to 500 p.s.i.g., with an acidic aqueous mixture of vanadium compounds as the oxidizing agent, which aqueous mixture contains an average of at least 2 gram atomic weights of vanadium chemically combined in said vanadium compounds per liter of the aqueous mixture and includes an at least partially dissolved pentavalent vanadium compound, selected from the class consisting of vanadium pentoxide and oxidation products of vanadyl sulfate, together with sufficient sulfate ions for such solubilization of vanadium in its pentavalent state.

11. A method for making ethyl methyl ketone which comprises oxidizing a normal butylene by reacting the latter, at a temperature of from 100° to 200° C. and a pressure of from 50 to 500 p.s.i.g., with an acidic aqueous mixture of vanadium compounds as the oxidizing agent, which aqueous mixture contains an average of at least 2 gram atomic weights of vanadium chemically combined in said vanadium compounds per liter of the aqueous mixture and includes an at least partially dissolved pentavalent vanadium compound, selected from the class consisting of vanadium pentoxide and oxidation products of vanadyl sulfate, together with sufficient sulfate ions for such solubilization of vanadium in its pentavalent state.

12. In a method, as claimed in claim 11, the steps of removing organic ingredients from the reacted mixture and conditioning the remaining aqueous mixture for re-use in the method of claim 11 by contacting it with an $O_2$-containing gas at a reaction temperature between 100° and 250° C. and a pressure of from 50 to 500 p.s.i.g., said aqueous mixture, after such contact with the $O_2$-containing gas, being acidic and of a degree of acidity corresponding to that resulting from such contact and from the presence of $H_2SO_4$ in not more than 2 molar concentration immediately prior to the treatment with the oxygen-containing gas.

13. A continuous method for the product of an acyclic carbonyl compound selected from the class consisting of aldehydes and ketones, which method comprises circulating an aqueous mixture of at least partially dissolved vanadium compounds, containing an average of at least 2 gram atomic weights of vanadium in said vanadium compounds per liter of the aqueous mixture, together with sufficient sulfate ions to appreciably solubilize vanadium when in its pentavalent state, repeatedly through a series of: (1) a zone wherein the aqueous mixture, in an acidic condition corresponding in acidity to that resulting from the presence of $H_2SO_4$ in not more than 2 molar concentration, is treated, at a temperature between 100° and 250° C. and at a pressure of from 50 to 500 p.s.i.g., with an $O_2$-containing gas and at least part of the vanadium is thereby oxidized to a pentavalent state such that the thus-treated mixture includes an at least partially dissolved pentavalent vanadium compound, selected from the class consisting of vanadium pentoxide and oxidation products of vanadyl sulfate, together with sufficient sulfate ions for such solubilization of vanadium in its pentavalent state; (2) a zone wherein the aqueous mixture is purged of unconsumed oxygen; (3) a zone wherein the aqueous mixture is reacted with an acyclic mono-olefine, having the olefinic linkage between hydrogen-bearing carbon atoms, at a temperature of from 100° C. to 200° C. and a pressure of from 50 to 500 p.s.i.g. to form a corresponding organic carbonyl compound; and (4) a zone wherein organic ingredients, including the organic carbonyl product, are vaporized from the aqueous mixture and are discharged from the last-mentioned zone; while feeding an oxygen-containing gas and a mono-olefine to the above-mentioned zones (1) and (3), respectively, and passing inert gas through the mixtures in the respective zones (2) and (4).

References Cited in the file of this patent
UNITED STATES PATENTS

| | | |
|---|---|---|
| 1,999,620 | Van Peski et al. | Apr. 30, 1935 |
| 2,197,101 | Eaglesfield | Apr. 16, 1940 |